(12) United States Patent
Butera et al.

(10) Patent No.: US 10,891,254 B2
(45) Date of Patent: Jan. 12, 2021

(54) SWITCHABLE TOPOLOGY PROCESSOR TILE AND COMPUTING MACHINE

(71) Applicant: Intel Corporation, Santa Clara, CA (US)

(72) Inventors: William J. Butera, Cambridge, MA (US); Simon C. Steely, Jr., Hudson, NH (US); Richard J. Dischler, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 530 days.

(21) Appl. No.: 15/637,581

(22) Filed: Jun. 29, 2017

(65) Prior Publication Data

US 2018/0113838 A1 Apr. 26, 2018

Related U.S. Application Data

(60) Provisional application No. 62/413,160, filed on Oct. 26, 2016.

(51) Int. Cl.
*G06F 9/38* (2018.01)
*G06F 15/173* (2006.01)

(52) U.S. Cl.
CPC .. *G06F 15/17381* (2013.01); *G06F 15/17343* (2013.01); *G06F 9/38* (2013.01); *G06F 9/3897* (2013.01)

(58) Field of Classification Search
CPC .............. G06F 15/17343; G06F 15/17381
See application file for complete search history.

(56) References Cited

U.S. PATENT DOCUMENTS

| | | | |
|---|---|---|---|
| 6,145,072 A * | 11/2000 | Shams | G06F 15/17343 710/2 |
| 7,581,081 B2 | 8/2009 | Gonzalez et al. | |
| 7,635,987 B1 * | 12/2009 | Agarwal | G06F 15/7867 326/39 |
| 7,774,579 B1 * | 8/2010 | Wentzlaff | G06F 15/8007 712/11 |
| 9,329,798 B1 | 5/2016 | Wentzlaff | |

(Continued)

FOREIGN PATENT DOCUMENTS

WO   2011-092323 A1   8/2011

OTHER PUBLICATIONS

International Search Report and Written Opinion dated Sep. 7, 2018 for International Application No. PCT/US2017/058011, 11 pages.

*Primary Examiner* — Jacob Petranek
(74) *Attorney, Agent, or Firm* — Schwabe, Williamson & Wyatt, P.C.

(57) ABSTRACT

Embodiments relate to a computational device including multiple processor tiles on a die that may have multiple switchable topologies. A topology of the computational device may include one or more virtual circuits. A virtual circuit may include multiple processor tiles. A processor tile of a virtual circuit of a topology may include a configuration vector to control a connection between the processor tile and a neighboring processor tile. A first topology of the computation device may correspond to a first phase of a computation of a program, and a second topology of the computation device may correspond to a second phase of the computation of the program. Other embodiments may be described and/or claimed.

22 Claims, 11 Drawing Sheets

(56) References Cited

U.S. PATENT DOCUMENTS

| | | | |
|---|---|---|---|
| 2010/0150147 A1* | 6/2010 | Khanduri | H04L 49/1515 |
| | | | 370/388 |
| 2015/0003281 A1 | 1/2015 | Hasenplaugh et al. | |
| 2015/0333756 A1* | 11/2015 | Wang | G06F 1/08 |
| | | | 326/41 |
| 2016/0140039 A1 | 5/2016 | Sodani et al. | |
| 2018/0109449 A1* | 4/2018 | Sebexen | H04L 45/70 |

* cited by examiner

SWITCHABLE TOPOLOGY PROCESSOR TILE AND COMPUTING MACHINE

CROSS REFERENCE TO RELATED APPLICATION

The present application claims priority from U.S. Provisional Patent Application No. 62/413,160, filed Oct. 26, 2016, and entitled "SWITCHABLE TOPOLOGY MACHINE," the entire disclosure of which is hereby incorporated by reference.

GOVERNMENT RIGHTS

This disclosure is made with government support under Contract No. #H98230-13-D-0124 to Intel Federal LLC. The contract may have been awarded by the Department of Defense (DoD). The government has certain rights in this disclosure.

FIELD

Embodiments of the present disclosure relate generally to the technical field of computing, and more particularly to the computing of multiple processor tiles.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Multicore on a die or multiple core chips may be organized into one-dimensional or two-dimensional arrays of processor tiles, where each processor tile may be a processor, or simply referred to as a tile. Each processor tile may be a computing unit, a processing engine, or a central processing unit (CPU), including caches and switches. Multiple processor tiles may be coupled to each other according to a topology. A large number of processor tiles, e.g., more than 500 processor tiles, may be formed on a die. The large number of processor tiles on a die may increase the communication complexity. Furthermore, a topology for multiple processor tiles may be fixed and cannot be changed during a computation of a program.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
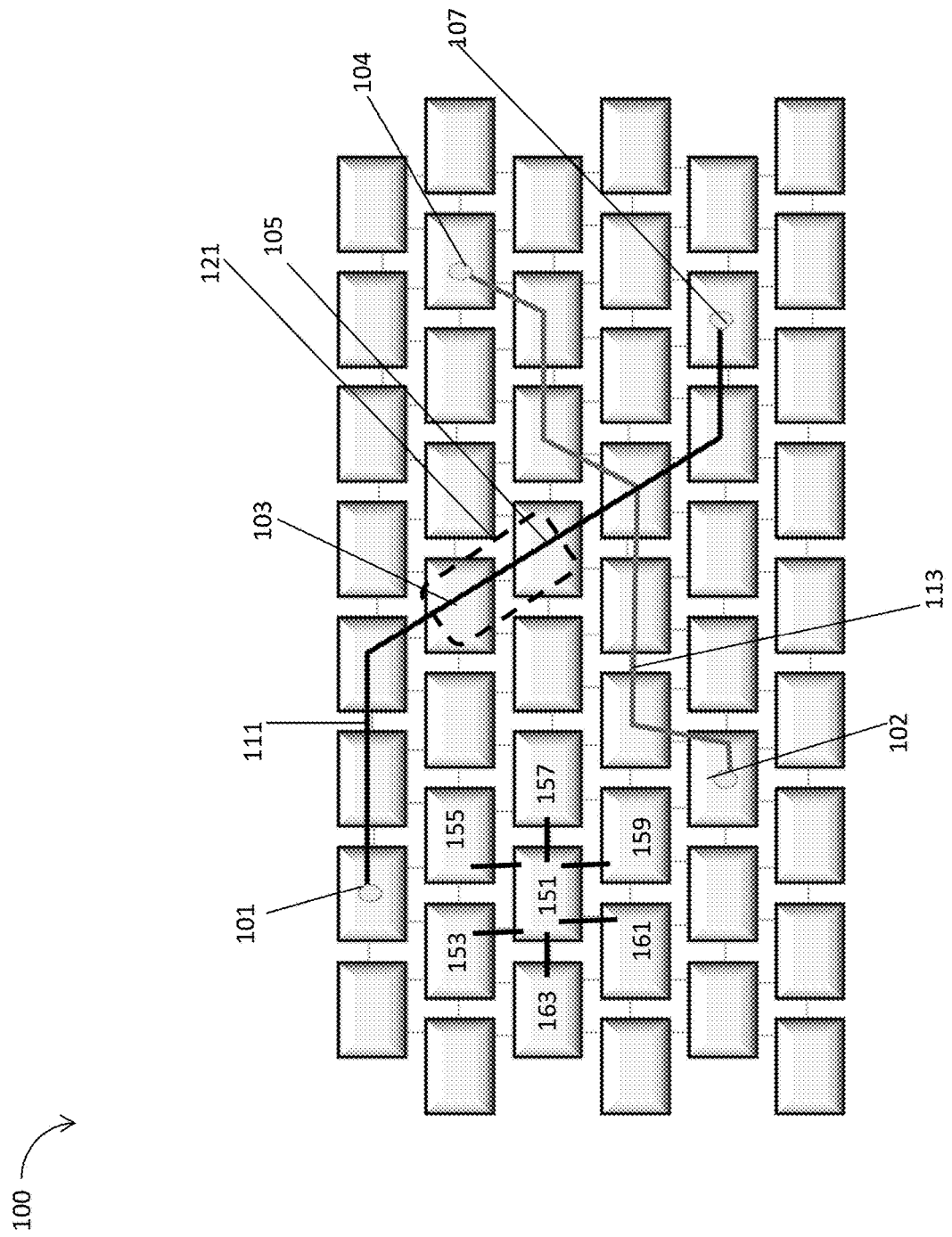
FIG. 1 illustrates an example computational device including multiple processor tiles on a die, and virtual circuits (VCs) including multiple processor tiles, in accordance with various embodiments.

Apparatuses, methods, and storage medium are disclosed herein related to performing a computation of a program in multiple phases by a computational device including multiple processor tiles on a die with switchable topologies. Embodiments herein may be a computational device with thousands of processor tiles. In embodiments, a virtual circuit (VC) may include multiple processor tiles. A message packet may traverse multiple processor tiles of a VC in a single clock cycle. A topology of the computational device may include multiple VCs forming a communication pattern. A topology may be efficient for some computing tasks, while not as efficient for some other computing tasks. Multiple processor tiles organized into one fixed topology that cannot be changed during a computation of a program may not be efficient for the multiple phases of the computation.

In embodiments, a computational device including multiple processor tiles on a die may have multiple switchable topologies. A first topology may correspond to a first phase of a computation of a program, and a second topology may correspond to a second phase of the computation of the program. When the computation of the program shifts from the first phase to the second phase, the computational device may switch from the first topology to the second topology, so that the first phase of the computation of the program may be performed by the computational device according to the first topology, and the second phase of the computation of the program may be performed by the computational device according to the second topology. With switchable topologies, the embodiments herein may provide more efficient computation and communication for various computing tasks of a program.

In embodiments, a computational device may include multiple processor tiles on a die with switchable topologies, where a topology of the computational device may include multiple VCs. A processor tile of a VC of a first topology may include a first configuration vector, and a processor tile of a VC of a second topology may include a second configuration vector. A configuration vector of a processor tile may represent a VC segment including the processor tile.

The first topology may correspond to a first phase of a computation of a program, while the second topology may correspond to a second phase of the computation of the program, where the second phase of the computation may be different from the first phase of the computation. The first configuration vector may be in an active state during the first phase of the computation of the program, and may be in an inactive state during the second phase of the computation. Similarly, the second configuration vector may be in an inactive state during the first phase of the computation of the program, and may be in an active state during the second phase of the computation.

In embodiments, a processor tile may include multiple interface blocks, a programmable interconnect, a memory, and a controller. The memory may store multiple configuration vectors. The controller may control connections between the programmable interconnect and the multiple interface blocks, based on the configuration vectors stored in the memory.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

FIG. 1 illustrates an example computational device 100 including multiple processor tiles, e.g., a processor tile 101, a processor tile 103, a processor tile 105, a processor tile 107, a processor 102, a processor tile 104, on a die, and virtual circuits (VCs), e.g., a VC 111, and a VC 113, including multiple processor tiles, in accordance with various embodiments. For clarity, features of the computational device 100 may be described below as an example for understanding an example computational device that may include multiple processor tiles. It is to be understood that there may be more or fewer components included in the computational device 100. Further, it is to be understood that one or more of the devices and components within the computational device 100 may include additional and/or varying features from the description below, and may include any device that one having ordinary skill in the art would consider and/or refer to as a computational device.

In embodiments, the computational device 100 may include the processor tile 101, the processor tile 103, the processor tile 105, the processor tile 107, the processor tile 102, the processor tile 104, a processor tile 151, a processor tile 153, a processor tile 155, a processor tile 157, a processor tile 159, a processor tile 161, a processor tile 163, in addition to many other processor tiles, on a die. In embodiments, there may be thousands of processor tiles included in the computational device 100. The processor tiles of the computational device 100 may have the same structure. In some other embodiments, the processor tiles of the computational device 100 may have different structures from one another.

In embodiments, a processor tile may be coupled to multiple other processor tiles. For example, the processor tile 151 may be coupled to the processor tile 153 at a direction of Northwest (NW), the processor tile 155 at a direction of Northeast (NE), the processor tile 157 at a direction of East (E), the processor tile 159 at a direction of Southeast (SE), the processor tile 161 at a direction of Southwest (SW), and the processor tile 163 at a direction of West (W). In some other embodiments, there may by different number of processor tiles coupled to a processor tile.

In embodiments, a VC may include multiple processor tiles. For example, the VC 111 may include the processor tile 101, the processor tile 103, the processor tile 105, the processor tile 107, in addition to other processor tiles. The VC 113 may include the processor tile 102 and the processor tile 104, in addition to other processor tiles. A VC may have states managed by controllers within the processor tiles of the VC. A VC may become active when all the processor tiles of the VC along the signal pathway of the VC become active with respect to the VC managed by the controllers of the processor tiles. Once a VC is active, a message packet may traverse the multiple processor tiles of the VC in a single clock cycle. For example, a message packet may traverse the multiple processor tiles of the VC 111, starting from the processor tile 101, and ending in the processor tile 107, in a single clock cycle. A VC segment may be a part of a VC and may include two processor tiles. For example, a VC segment 121 of the VC 111 may include the processor tile 103 and the processor tile 105.

Figure 2:
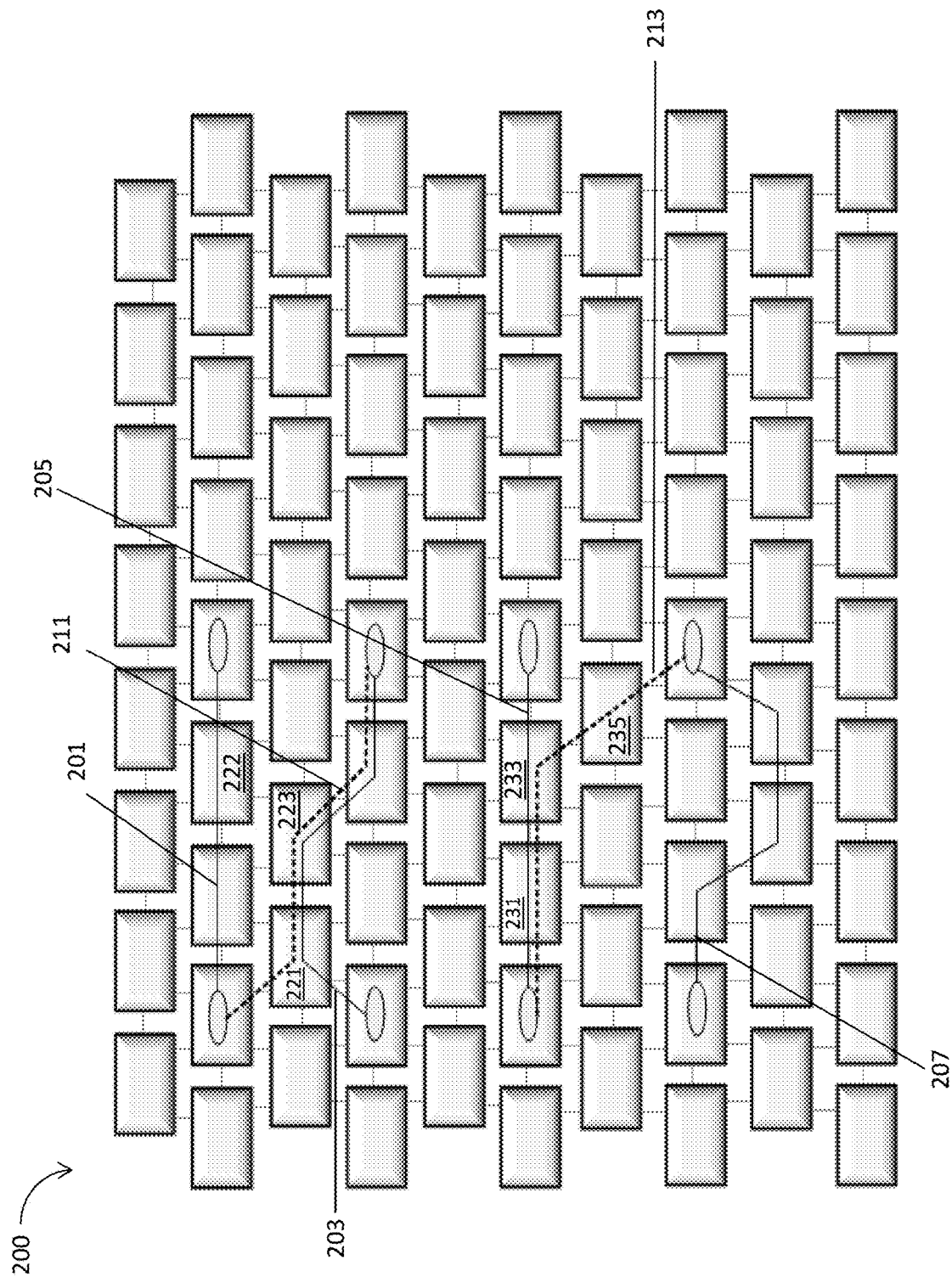
FIG. 2 illustrates another example computational device including multiple processor tiles on a die with switchable multiple topologies, in accordance with various embodiments.

FIG. 2 illustrates another example computational device 200 including multiple processor tiles on a die with switchable multiple topologies, in accordance with various embodiments. The computational device 200 may be an example of the computational device 100 shown in FIG. 1.

In embodiments, the computational device 200 may include multiple processor tiles, e.g., a processor tile 221, a processor tile 222, a processor tile 223, a processor tile 231, a processor tile 233, a processor tile 235, and more. The processor tile 221, the processor tile 222, the processor tile 223, the processor tile 231, the processor tile 233, and the processor tile 235 may be similar to the processor tile 101, the processor tile 103, the processor tile 105, the processor tile 107, the processor tile 102, the processor tile 104, the processor tile 151, the processor tile 153, the processor tile 155, the processor tile 157, the processor tile 159, the processor tile 161, or the processor tile 163, as shown in FIG. 1.

In embodiments, the computational device 200 may include multiple VCs, e.g., a VC 201, a VC 203, a VC 205, a VC 207, a VC 211, and a VC 213. Each VC may include multiple processor tiles. For example, the VC 211 may include the processor tile 221, the processor tile 223, and other processor tiles. The VC 205 may include the processor tile 231, the processor tile 233, and other processor tiles. Some processor tiles may be included in multiple VCs. For example, the processor tile 231 and the processor tile 233 may be included in the VC 205 and the VC 213. Some other processor tiles may be included in only one VC. For example, the processor tile 222 may be included in the VC 201 only, and the processor tile 235 may be included in the VC 213 only.

In embodiments, a topology of the computational device 200 may include one or more VCs. For example, a first topology of the computational device 200 may include the VC 201, the VC 203, the VC 205, and the VC 207. A second topology of the computational device 200 may include the VC 211 and the VC 213.

In embodiments, a topology of the computational device 200 may correspond to a phase of a computation of a program. For example, the first topology including the VC 201, the VC 203, the VC 205, and the VC 207 may correspond to a first phase of a computation of a program, while the second topology including the VC 211 and the VC 213 may correspond to a second phase of the computation of the program. A processor tile of a VC of the first topology, e.g., the processor tile 222 of the VC 201 of the first topology, may be in an active state during the first phase of the computation of the program, and may be in an inactive state during the second phase of the computation of the program. The state of the processor tile 222 may be controlled by a configuration vector stored in the processor tile 222 of the VC 201 of the first topology. Similarly, a processor tile of a VC of the second topology, e.g., the processor tile 235 of the VC 213 of the second topology, may be in an inactive state during the first phase of the computation of the program, and may be in an active state during the second phase of the computation of the program. The state of the processor tile 235 may be controlled by a configuration vector stored in the processor tile 235 of the VC 213 of the second topology.

In embodiments, a processor tile may be included in multiple VCs and multiple topologies. For example, the processor tile 221 may be included in the VC 203 and the VC 211. When the processor tile 221 is included in the VC 203, it is included in the first topology. When the processor tile 221 is included in the VC 211, it is included in the second topology. When a processor tile is included in multiple VCs and multiple topologies, the processor tile may include multiple configuration vectors stored in the memory of the processor tile to indicate the VCs and the topologies the processor tile is included. For example, the processor tile 221 may include a first configuration vector to indicate that the processor tile 221 is included in the VC 203 of the first topology, and include a second configuration vector to indicate that the processor tile 221 is included in the VC 211 of the second topology.

In embodiments, a program may be any kind of software with its computation being carried out by the computational device 200. A program may include multiple phases of computation. For example, as shown below, a program may include 4 phases of computation, each phase of computation includes different tasks with different computation pattern.

| Phases of computation | Tasks | Communication patterns |
|---|---|---|
| 1. compute the gradient | $g(t) = Ax(t-1) - b$ | Halo exchange |
| 2. compute direction vector | $d(t) = \left[\frac{g(t)^T g(t)}{g(t-1)^T g(t-1)} d(t-1)\right] - g(t)$ | Dot product, broadcast |
| 3. update step size s(t) | $s(t) = \left[\frac{d(t)^T g(t)}{d(t)^T A d(t)}\right]$ | Dot product, broadcast |
| 4. roll up update for x(t) | $x(t) = x(t-1) + s(t)d(t)$ | Vector multiply |

The first phase, compute the gradient, may be performed by the computational device 200 according to the first topology including the VC 201, the VC 203, the VC 205, and the VC 207. The second phase, compute direction vector, may be performed by the computational device 200 according to the second topology including the VC 211 and the VC 213. There may be other topologies to perform other phases of the computations, not shown.

Figure 3:
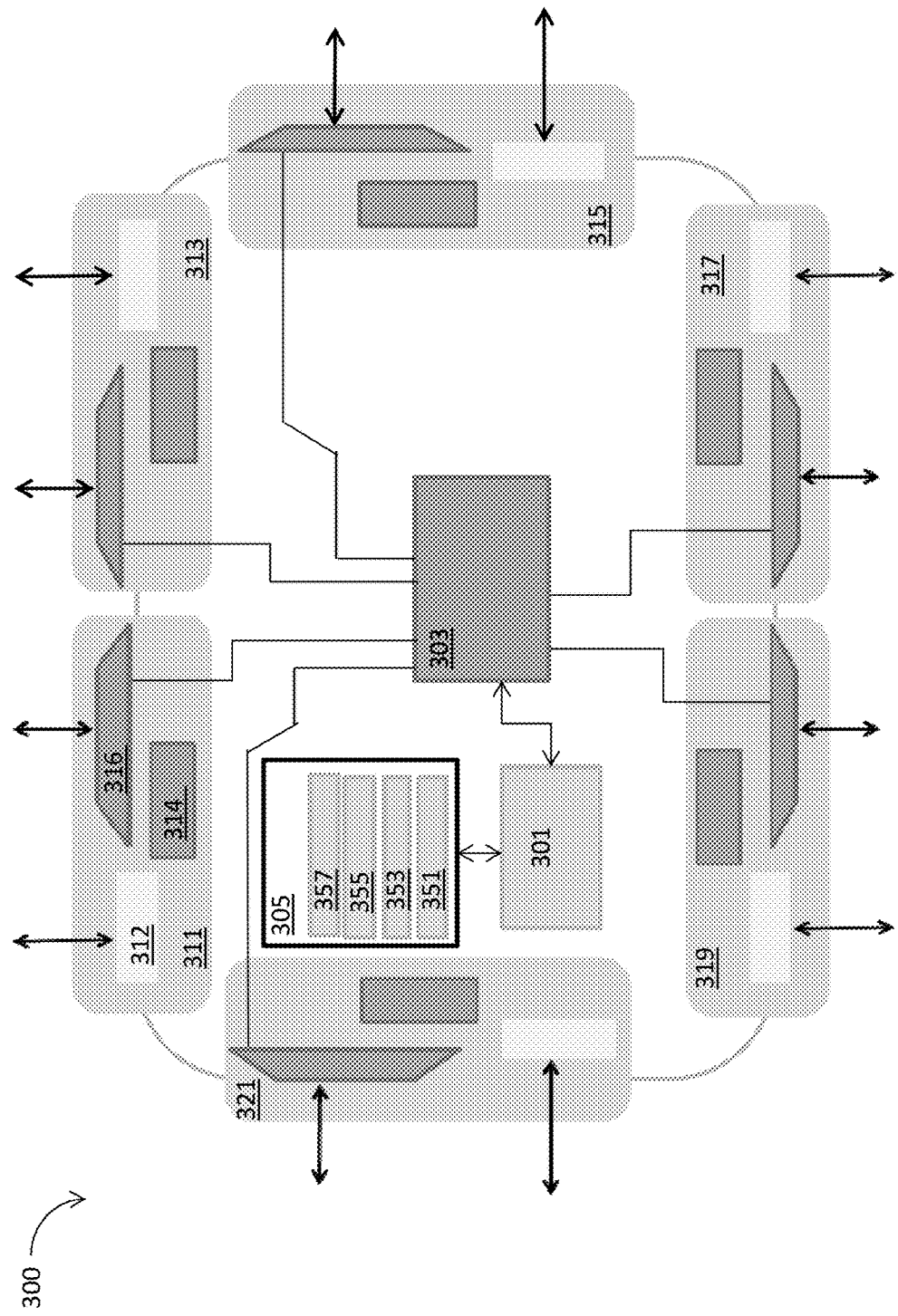
FIG. 3 illustrates an example processor tile including a controller, a programmable interconnect, and multiple interface blocks, in accordance with various embodiments.

FIG. 3 illustrates an example processor tile 300 including a controller 301, a programmable interconnect 303, and multiple interface blocks, e.g., an interface block 311, an interface block 313, an interface block 315, an interface block 317, an interface block 319, and an interface block 321, in accordance with various embodiments. The processor tile 300 may be an example of the processor tile 101, or any other processor tile, of the computational device 100 shown in FIG. 1.

In embodiments, the processor tile 300 may be a node of a VC. The processor tile 300 may be a transit node of a VC when a message packet may pass through the processor tile 300 to another processor tile. On the other hand, the processor tile 300 may be a terminal node of a VC when a message packet may be saved locally within the processor tile 300.

Figure 6:
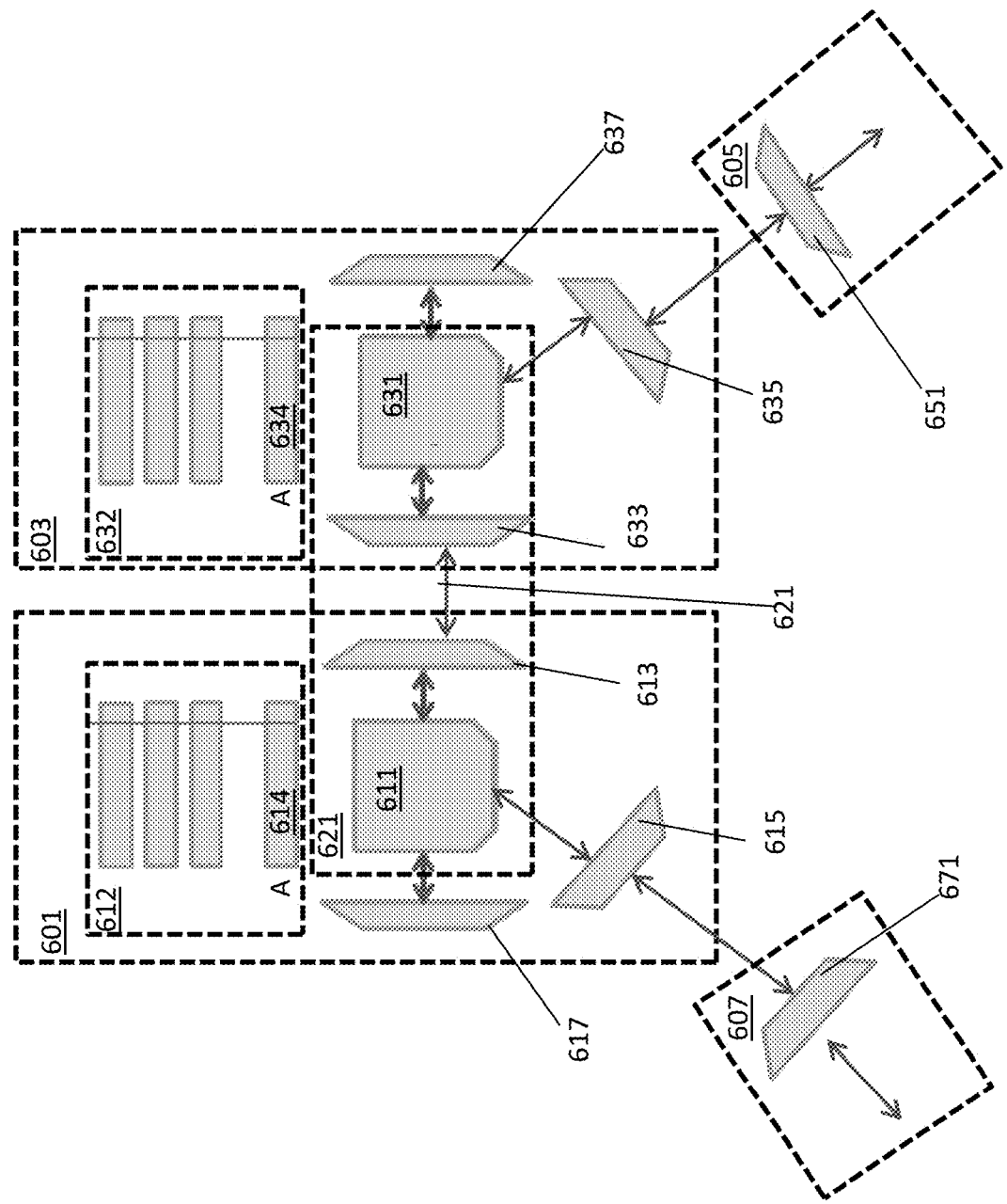
FIG. 6 illustrates an example formation of a VC segment between two different processor tiles, in accordance with various embodiments.

In embodiments, the processor tile 300 may include multiple interface blocks, e.g., the interface block 311, the interface block 313, the interface block 315, the interface block 317, the interface block 319, and the interface block 321. The six interface blocks, e.g., the interface block 311, the interface block 313, the interface block 315, the interface block 317, the interface block 319, and the interface block 321, may be placed in a direction of East (E), a direction of West (W), a direction of Northeast (NE), a direction of Northwest (NW), a direction of Southeast (SE), and a direction of Southwest (SW). Each interface block may be coupled to another interface block of another processor tile to form a connection so that a VC segment may be formed between the processor tile 300 and another processor tile, as shown in FIG. 6.

In embodiments, an interface block, e.g., the interface block 311, the interface block 313, the interface block 315, the interface block 317, the interface block 319, or the interface block 321, may include a selector, a local storage, and a message passing storage. For example, the interface block 311 may include a selector 316, a local storage 314, and a message passing storage 312. The selector 316 may be used to control the connection for the interface block 311. When the selector 316 is off, the interface block 311 may not have an active connection with other components of the processor tile 300. When the processor tile 300 may be a terminal node of a VC, a message packet of a computation may enter the processor tile 300 through the interface block 311, and may be stored in the local storage 314 of the interface block 311. On the other hand, when the processor tile 300 may be a transit node of a VC, a message packet of a computation may enter the processor tile 300 through the interface block 311, and may pass through the selector 316 to be transferred to a next processor tile. The message passing storage 312 may be used for computations not involving the VC, but for other connections to other processor tiles.

The processor tile 300 may also include the programmable interconnect 303 coupled to the multiple interface blocks. In embodiments, the programmable interconnect 303 may be a multi-way crossbar. When the processor tile 300 may be a transit node of a VC, a message packet may enter the processor tile 300 through a first interface block, pass through the programmable interconnect 303, and exit the processor tile 300 through a second interface block.

The processor tile 300 may further include a memory 305 to store multiple configuration vectors e.g., a configuration vector 351, a configuration vector 353, a configuration vector 355, and a configuration vector 357. In embodiments, a configuration vector may represent a VC segment including the processor tile 300. In embodiments, a configuration vector may have a life cycle that includes an idle state, an issue ready state, a loaded state, an active state, a retired state, or an inactive state.

The controller 301 may be coupled to the multiple interface blocks, the memory 305, and the programmable interconnect 303 to control connections between the programmable interconnect 303 and the multiple interface blocks, based on the configuration vectors stored in the memory 305. The controller 301 may manage a life cycle of a configuration vector stored in the memory 305. For example, detailed operations of the controller 301 may be presented in FIG. 9.

Figure 4:
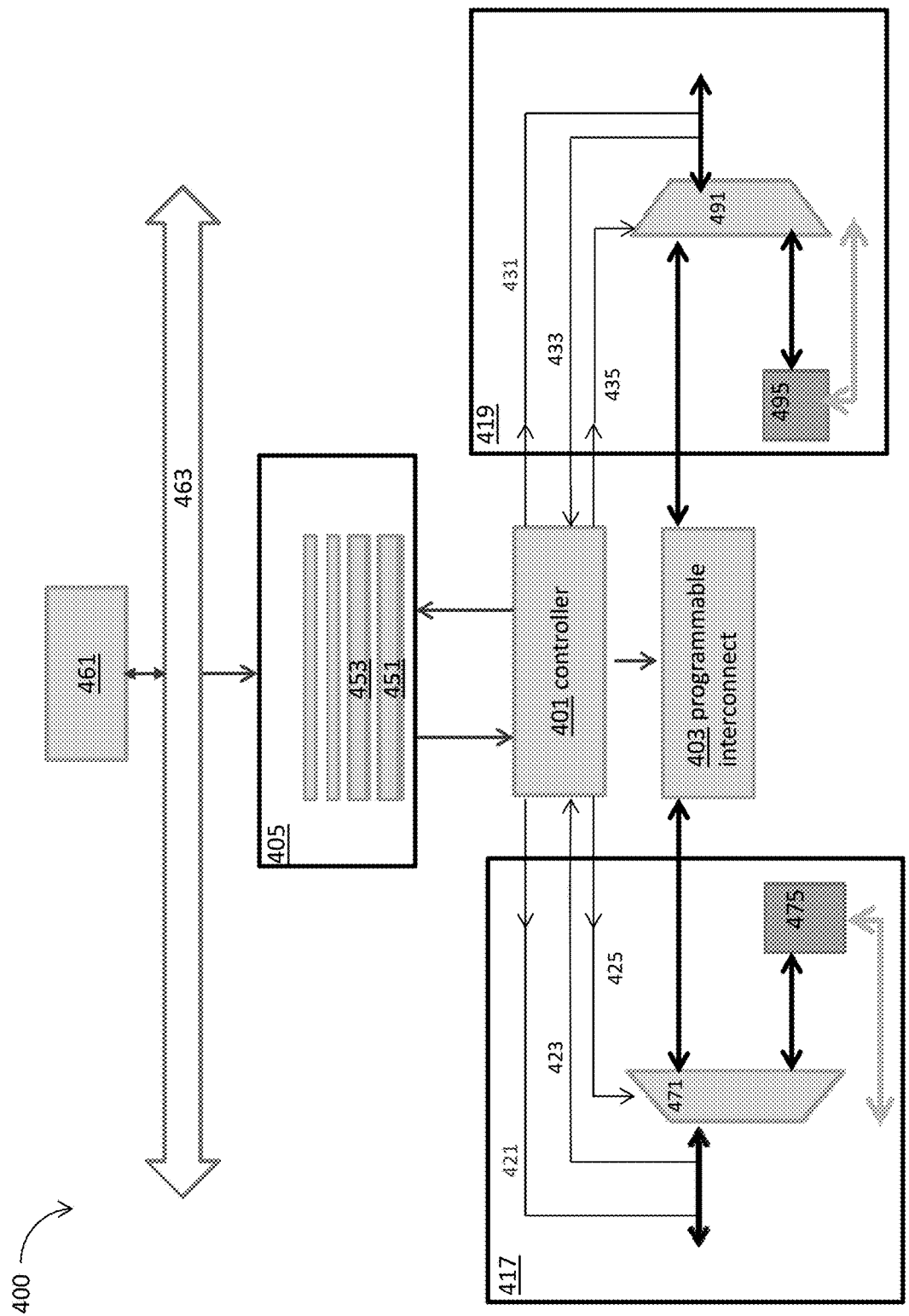
FIG. 4 illustrates an example controller of a processor tile to control connections between a programmable interconnect and multiple interface blocks, in accordance with various embodiments.

FIG. 4 illustrates an example controller 401 of a processor tile 400 to control connections between a programmable interconnect 403 and multiple interface blocks, e.g., an interface block 417 and an interface block 419, in accordance with various embodiments. The processor tile 400 may be an example of the processor tile 101, or any other processor tile, of the computational device 100 as shown in FIG. 1, or an example of the processor tile 300 as shown in FIG. 3. Similarly, the interface block 417 and the interface block 419 may be an example of the interface block 317 and the interface block 319, or any other interface blocks, as shown in FIG. 3. The controller 401 and the programmable interconnect 403 may be an example of the controller 301 and the programmable interconnect 303 as shown in FIG. 3.

In embodiments, the processor tile 400 may include the controller 401, the programmable interconnect 403, the memory 405, the interface block 417, the interface block 419, a bus 463, and a core 461, in addition to other components normally included in a processor tile. Similar to the interface block 311 shown in FIG. 3, the interface block 417 may include a local storage 475, and a selector 471. The interface block 419 may include a local storage 495, and a selector 491. The memory 405 may include multiple configuration vectors e.g., a configuration vector 451, and a configuration vector 453.

In embodiments, when the processor tile 400 is a transit node of a VC, a message packet of a computation, or a message packet of a phase of a computation, may enter the processor tile 400 through the first interface block, e.g., the interface block 417, pass through the programmable interconnect 403, and exit the processor tile 400 through the second interface block, e.g., the interface block 419. In some other embodiments, when the processor tile 400 is a terminal node of a VC, a message packet of a computation may enter the processor tile 400 through an interface block, e.g., the interface block 417, and may be stored in the local storage 475. The message packet stored locally in the local storage 475 may be further transferred by the bus 463 for computation performed in the core 461.

The controller 401 may control connections between the programmable interconnect 403, the interface block 417, and the interface block 419, so that the message packet may go through the interface block 417, the programmable interconnect 403, and the interface block 419. The controller 401 may control connections based on a configuration vector, e.g., the configuration vector 451, which may indicate to connect the programmable interconnect 403, the interface block 417, and the interface block 419. The controller 401 may enable the connection of the interface block 417 through the selector 471 by activating the selection line 425, or enable the connection of the interface block 419 through the selector 491 by activating the selection line 435. In addition, the controller 401 may enable the connection of the interface block 417 by way of an outgoing control line 421, or enable the connection of the interface block 419 by way of an outgoing control line 431. Furthermore, the controller 401 may detect a signal on an incoming control line 423 for the interface block 417, or detect a signal on an incoming control line 433 for the interface block 419.

The controller 401 may manage a life cycle of a configuration vector, e.g., the configuration vector 451, stored in the memory. In embodiments, the life cycle of the configuration vector 451 may include an idle state, an issue ready state, a loaded state, an active state, a retired state, an inactive state, or other states.

Figure 5:
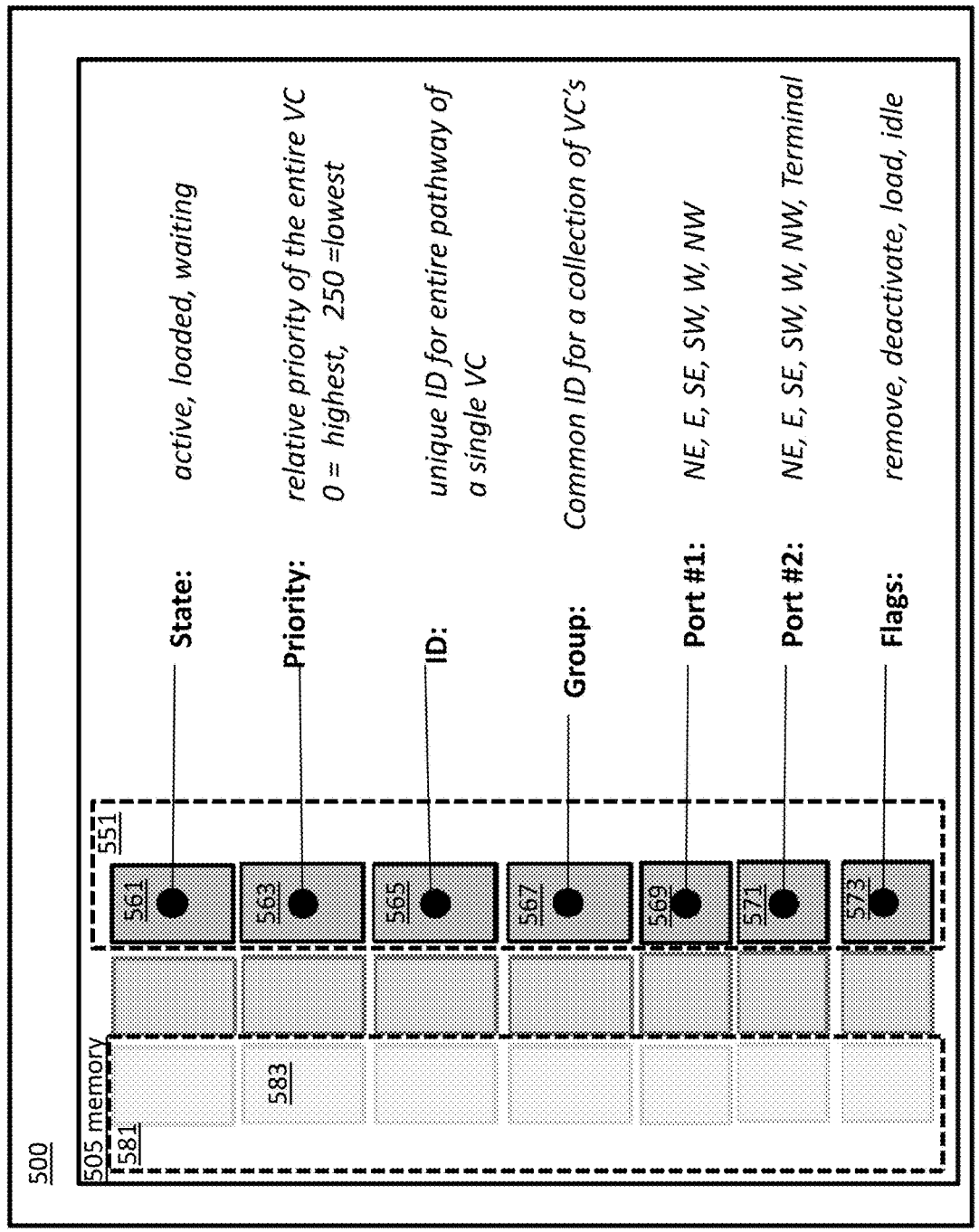
FIG. 5 illustrates an example configuration vector stored in a memory of a processor tile to control a connection between a programmable interconnect and multiple interface blocks, in accordance with various embodiments.

FIG. 5 illustrates an example configuration vector 551 stored in a memory 505 of a processor tile 500 to control a connection between a programmable interconnect and multiple interface blocks, in accordance with various embodiments. The processor tile 500 may be an example of the processor tile 101, or any other processor tile, of the computational device 100 shown in FIG. 1, an example of the processor tile 300 shown in FIG. 3, an example of the processor 400 shown in FIG. 4. The configuration vector 551 may be an example of the configuration vector 451 as shown in FIG. 4, or an example of the configuration vector 351 as shown in FIG. 3. The configuration vector 551 may be stored in the memory 505, which may be an example of the memory 405 of the processor tile 400 in FIG. 4, or the memory 305 of the processor tile 300 in FIG. 3.

In embodiments, a configuration vector, e.g., the configuration vector 551 may include a first information to identify a VC the processor tile 500 may be in, a second information to identify a topology the VC may be in, a third information to identify a priority of the configuration vector 551 as compared to other configuration vectors, e.g., a configuration vector 581, a first port to be coupled to an entering neighbor processor tile, and a second port to be coupled to an exit neighbor processor tile. For example, the configuration vector 551 may include a VC identification 565, a topology identification 567, a priority 563, a first port 569, and a second port 571. The priority 563 may indicate the importance of the configuration vector 551 compared to other configuration vectors. For example, another configuration vector 581 may include a priority 583. When the priority 563 is higher than the priority 583, a controller of the processor tile 500 may select the configuration vector 551 over the configuration vector 581 to control the connections within the processor tile 500.

In addition, the configuration vector 551 may include a state 561, which may indicate a state of a life cycle of the configuration vector 551. For example, the configuration vector 551 may include an idle state, an issue ready state, a loaded state, an active state, a retired state, or an inactive state. Furthermore, the configuration vector 551 may include a flag 573, which may include some other status values, such as remove status, deactivate status, load status, or idle status. There may be other parameters included in the configuration vector 551, which are not shown.

FIG. 6 illustrates an example formation of a VC segment 621 between two different processor tiles, e.g., a processor tile 601 and a processor tile 603, in accordance with various embodiments. The processor tile 601 may be an example of the processor tile 103 of the computational device 100, the processor tile 603 may be an example of the processor tile 105 of the computational device 100, and the VC segment 621 may be an example of the VC segment 121, as shown in FIG. 1.

In embodiments, the processor tile 601 may include a memory 612 including a configuration vector 614, a programmable interconnect 611, and multiple interface blocks, e.g., an interface block 613, an interface block 615, and an interface block 617. The processor tile 603 may include a memory 632 including a configuration vector 634, a programmable interconnect 631, and multiple interface blocks, e.g., an interface block 633, an interface block 635, and an interface block 637. The configuration vector 614 may indicate that the processor tile 601 may be coupled to the processor tile 603 to form the VC segment 621. Similarly, the configuration vector 634 may indicate that the processor tile 603 may be coupled to the processor tile 601 to form the VC segment 621. In detail, the configuration vector 614 may indicate a connection between the interface block 613 and the programmable interconnect 611. Similarly, the configuration vector 634 may indicate a connection between the interface block 633 and the programmable interconnect 631. The configuration vector 614 and the configuration vector 634 may further indicate the connection between the interface block 613 and the interface block 633 so that the VC segment 621 may be formed.

In embodiments, the interface block 613 of the processor tile 601 may be coupled to the interface block 633 of the processor tile 603 through a link 621. The link 621 may include an outgoing control line to the processor tile 601, which may be an incoming control line to the processor tile 603. In addition, the link 621 may include an incoming control line to the processor tile 601, which may be an outgoing control line to the processor 603. To enable the link 621 between the processor tile 601 and the processor tile 603, the controller of the processor tile 601 may assert a code on an outgoing control line of the link 621 to indicate that the configuration vector 614 is in a loaded state. The controller of the processor tile 601 may further detect a signal on an incoming control line of the link 621 to indicate the neighbor processor tile, e.g., the processor tile 603, determined by the configuration vector 634, is in a loaded state. Afterwards, the link 621 may be enabled between the processor tile 601 and the processor tile 603 to activate the configuration vector 614 and the configuration vector 634 in the loaded state to become the active state. Hence, a message packet of a computation may start from a processor tile 607, going through an interface block 671, and the interface block 615, pass through the interface block 613, through the link 612, to the interface block 633. In addition, the message packet may further be transferred to a processor tile 605 through the interface block 635 and an interface block 651.

Figure 7:
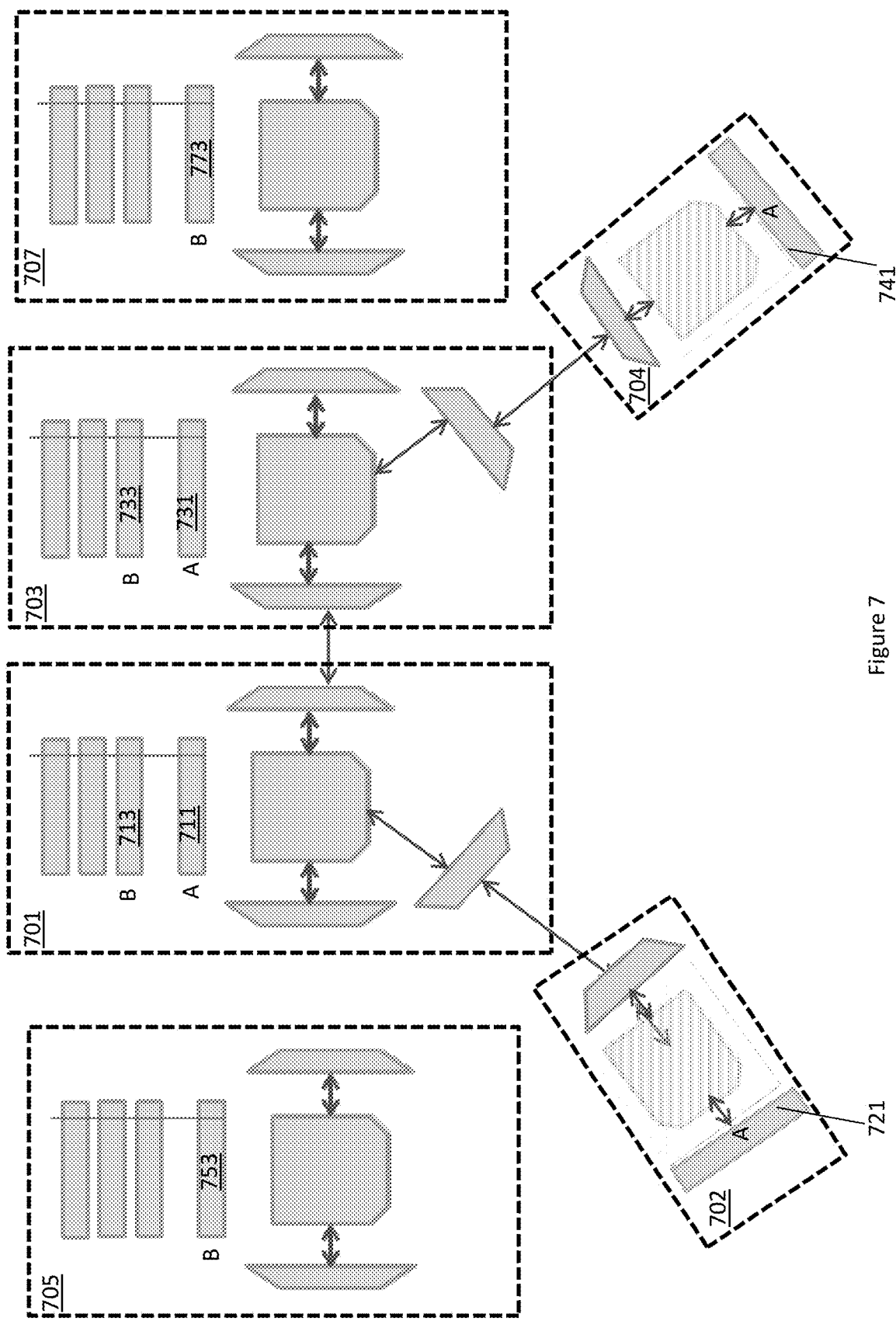
FIGS. 7-8 illustrate an example of an arbitration during the process of forming two VC's, in accordance with various embodiments.
Figure 8:
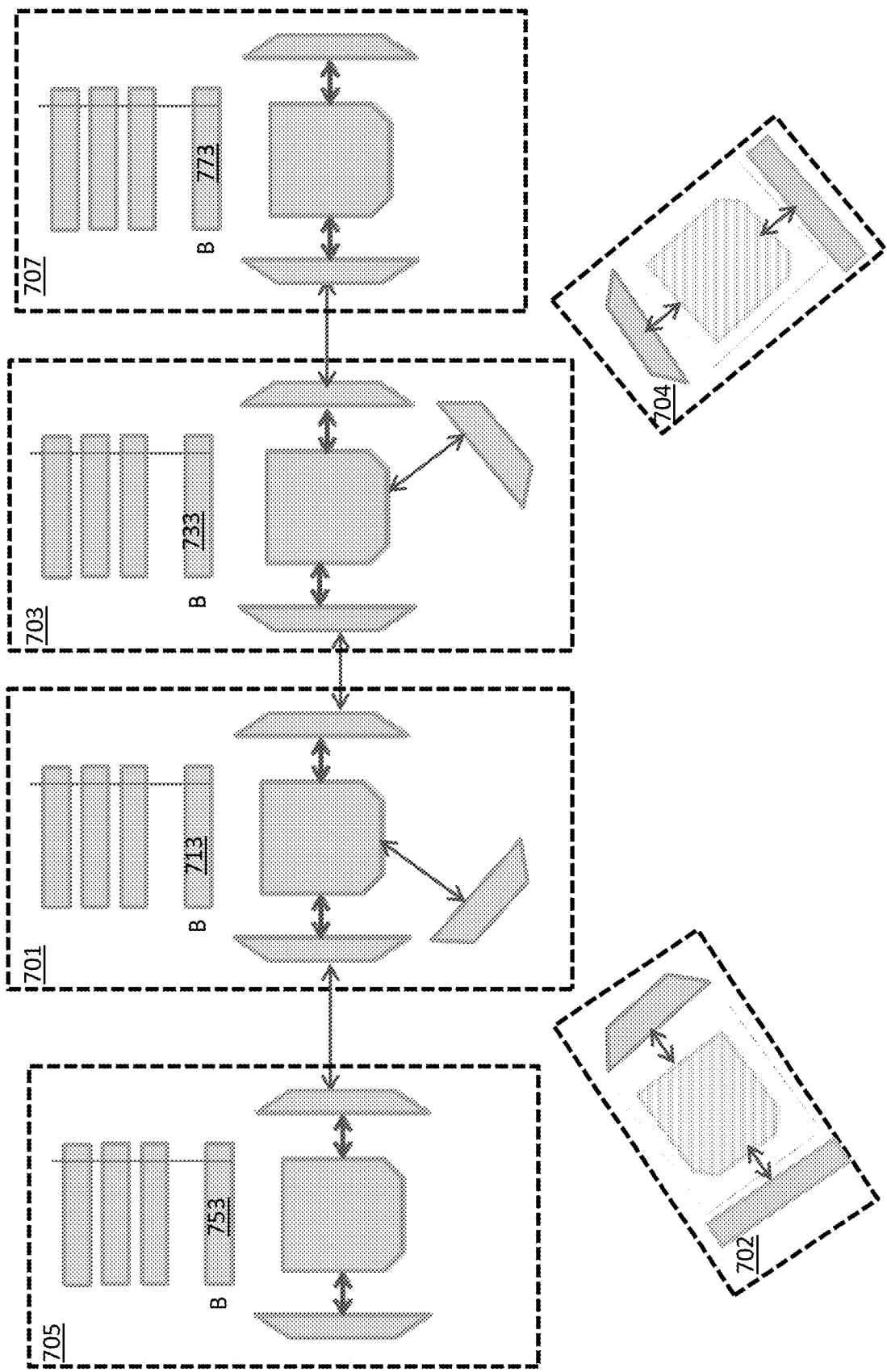

FIGS. 7-8 illustrate an example arbitration processor between two VC's, e.g., a VC, e.g., a VC A and a VC B, in accordance with various embodiments. The VC A or the VC B may be an example of the VC 201, the VC 203, the VC 205, the VC 207, the VC 211, the VC 213, or any other VCs as shown in FIG. 2 or FIG. 1.

In embodiments, the VC A may include a processor tile 701, a processor tile 703, a processor tile 702, and a processor tile 704. The VC A may be controlled by a configuration vector 711 within the processor tile 701, a configuration vector 731 within the processor tile 703, a configuration vector 721 within the processor tile 702, and a configuration vector 741 within the processor tile 704.

In embodiments, the VC B may include the processor tile 701, the processor tile 703, a processor tile 705, and a processor tile 707. The VC B may be controlled by a configuration vector 713 within the processor tile 701, a configuration vector 733 within the processor tile 703, a configuration vector 753 within the processor tile 705, and a configuration vector 773 within the processor tile 707.

In embodiments, the processor tile 701 and the processor tile 703 may be included in both the VC A and the VC B. The configuration vector 711 stored in the processor tile 701 for the VC A may have a higher priority than the configuration vector 713 stored in the processor tile 701 for the VC B. Similarly, the configuration vector 731 stored in the processor tile 703 for the VC A may have a higher priority than the configuration vector 733 stored in the processor tile 703 for the VC B. Therefore, the configuration vector 711 may be loaded before the configuration vector 713 in the processor tile 701, while the configuration vector 731 may be loaded before the configuration vector 733 in the processor tile 703. Such a process of loading the configuration vector 711 ahead of loading the configuration vector 713 may be an example of arbitration of VCs.

As shown in FIG. 7, when the configuration vector 711, the configuration vector 731, the configuration vector 721, the configuration vector 741, are all loaded and activated, the VC A may be in an active state. Hence, a message packet of a computation may start from the processor tile 702, pass through the processor tile 701, the processor tile 703, and may further be transferred to the processor tile 704. Such a message packet may be for a first phase of the computation. After the first phase of the computation is finished, the configuration vector 711, the configuration vector 731, the configuration vector 721, the configuration vector 741 may change to a retired state.

As shown in FIG. 8, after the configuration vector 711, the configuration vector 731, the configuration vector 721, the configuration vector 741 are all in a retired state, which are not shown in FIG. 8, the configuration vector 713, the configuration vector 733, the configuration vector 753, and the configuration vector 773, may be loaded and activated, the VC B may be in an active state. Hence, a message packet of a computation may start from the processor tile 705, pass through the processor tile 701, the processor tile 703, and may further be transferred to the processor tile 707. Such a message packet may be for a second phase of the computation, which may be a different phase from the first phase of the computation.

Figure 9:
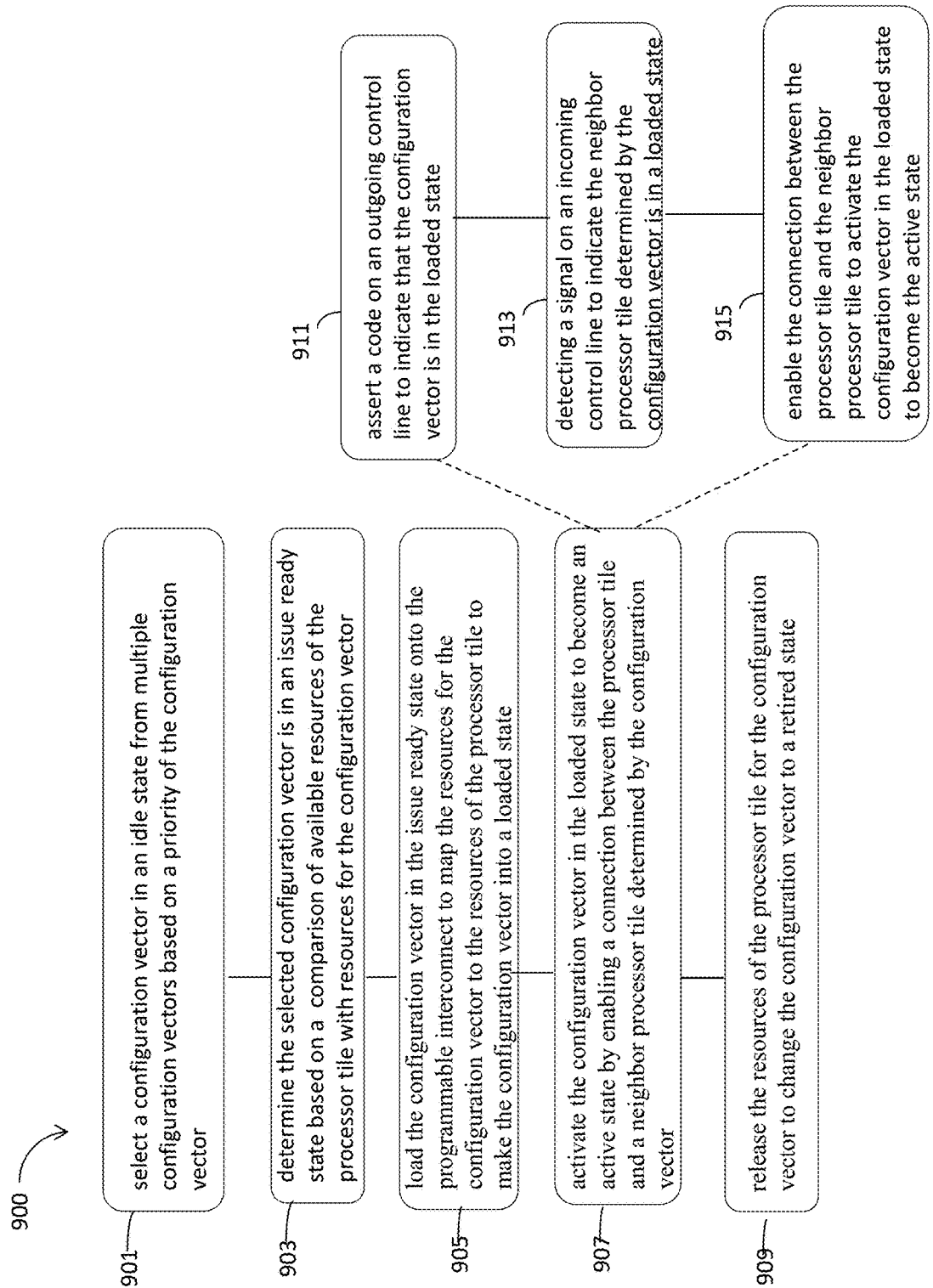
FIG. 9 illustrates an example process for a controller of a processor tile to control connections between a programmable interconnect and multiple interface blocks, in accordance with various embodiments.

FIG. 9 illustrates an example process 900 for a controller of a processor tile to control connections between a programmable interconnect and multiple interface blocks, in accordance with various embodiments. In embodiments, the process 900 may be a process performed by the controller 301 shown in FIG. 3, the controller 401 shown in FIG. 4, or any controller included in the processor tiles of the computational device 100 shown in FIG. 1.

The process 900 may start at an interaction 901. During the interaction 901, the controller may select a configuration vector in an idle state from multiple configuration vectors based on a priority of the configuration vector. For example, at the interaction 901, the controller 301 may select the configuration vector 351 from the memory 305 based on its priority.

During an interaction 903, the controller may determine the selected configuration vector is in an issue ready state based on a comparison of available resources of the processor tile with resources for the configuration vector.

During an interaction 905, the controller may load the configuration vector in the issue ready state onto the programmable interconnect to map the resources for the configuration vector to the resources of the processor tile to make the configuration vector into a loaded state.

During an interaction 907, the controller may activate the configuration vector in the loaded state to become an active state by enabling a connection between the processor tile and a neighbor processor tile determined by the configuration vector.

In more detail, the interaction 907 may further include multiple interactions. For example, during an interaction 911, the controller may assert a code on an outgoing control line to indicate that the configuration vector is in the loaded state. During an interaction 913, the controller may detect a signal on an incoming control line to indicate the neighbor processor tile determined by the configuration vector is in a loaded state. During an interaction 915, the controller may enable the connection between the processor tile and the neighbor processor tile to activate the configuration vector in the loaded state to become the active state.

During an interaction 909, the controller may release the resources of the processor tile for the configuration vector to change the configuration vector to a retired state.

Figure 10:
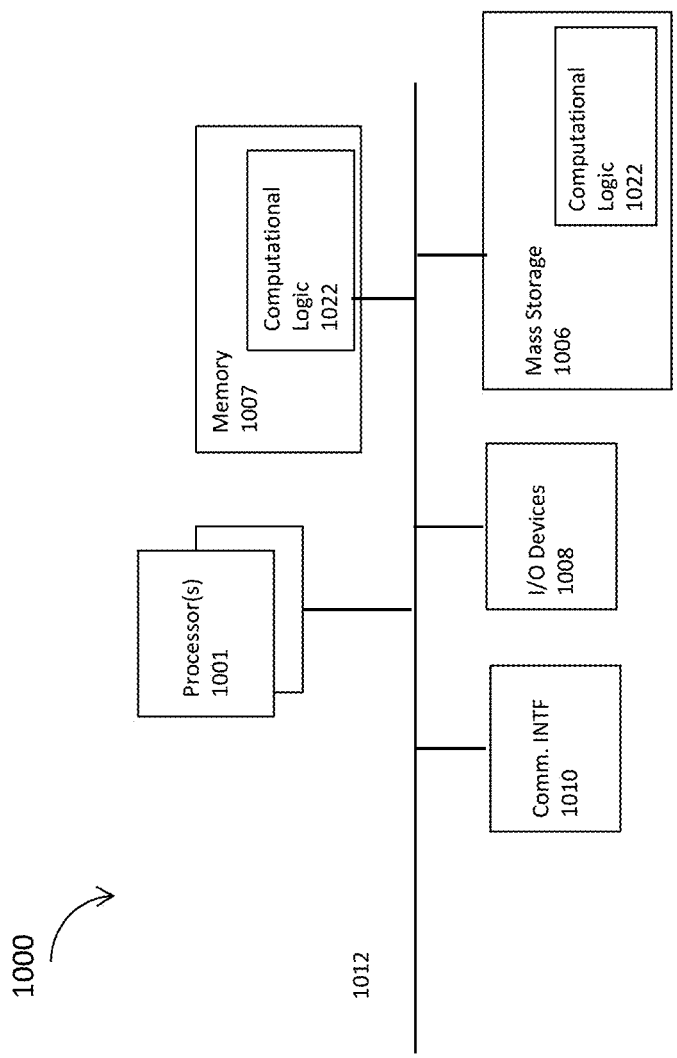
FIG. 10 illustrates an example device suitable for use to practice various aspects of the present disclosure, in accordance with various embodiments.

FIG. 10 illustrates an example computational device 1000 that may be suitable as a device to practice selected aspects of the present disclosure. As shown, the device 1000 may include one or more processors 1001, each having one or more processor cores. The device 1000 may be an example of the computational device 100 as shown in FIG. 1, the computational device 200 as shown in FIG. 2, and the one or more processors 1001 may be an example of the processor tile 101 as shown in FIG. 1, the processor tile 201 as shown in FIG. 2, or the processor tile 30 as shown in FIG. 3. In addition, the device 1000 may include a memory 1007, which may be any one of a number of known persistent storage medium; a mass storage 1006, and one or more input/output devices 1008. Furthermore, the device 1000 may include a communication interface 1010. The communication interface 1010 may be any one of a number of known communication interfaces. The elements may be coupled to each other via system bus 1012, which may represent one or more buses. In the case of multiple buses, they may be bridged by one or more bus bridges (not shown).

In embodiments, the one or more processors 1001 may be similar to the processors discussed above, and may include a controller, a programmable interconnect, e.g., a crossbar, as discussed above. For the purpose of this application, including the claims, the terms "processor," "processor core," or "processor tile" may be considered synonymous, unless the context clearly requires otherwise. The one or more processors 1001 may include any type of processors, such as a central processing unit (CPU), a microprocessor, and the like. The one or more processors 1001 may be implemented as an integrated circuit having multi-cores, e.g., a multi-core microprocessor.

In embodiments, the device 1000 may include mass storage devices 1006 (such as diskette, hard drive, volatile memory (e.g., dynamic random-access memory (DRAM), compact disc read-only memory (CD-ROM), digital versatile disk (DVD), and so forth). In general, system memory 1007 and/or mass storage devices 1006 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

In embodiments, the device 1000 may further include I/O devices 1008 (such as a display (e.g., a touchscreen display), keyboard, cursor control, remote control, gaming controller, image capture device, and so forth) and communication interfaces 1010 (such as network interface cards, modems, infrared receivers, radio receivers (e.g., Bluetooth), and so forth).

In embodiments, the communication interfaces 1010 may include communication chips (not shown) that may be configured to operate the device 1000 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1010 may operate in accordance with other wireless protocols in other embodiments.

The above-described device 1000 elements may be coupled to each other via system bus 1012, which may represent one or more buses. In the case of multiple buses, they may be bridged by one or more bus bridges (not shown). Each of these elements may perform its conventional functions known in the art. In particular, system memory 1007 and mass storage devices 1006 may be employed to store a working copy and a permanent copy of the programming instructions for the operation of various components of the device 1000, including but not limited to an operating system of the device 1000 and/or one or more applications. The various elements may be implemented by assembler instructions supported by the one or more processors 1001 or high-level languages that may be compiled into such instructions.

The permanent copy of the programming instructions may be placed into mass storage devices 1006 in the factory, or in the field through, for example, a distribution medium (not shown), such as a compact disc (CD), or through communication interface 1010 (from a distribution server (not shown)). That is, one or more distribution media having an implementation of the agent program may be employed to distribute the agent and to program various computing devices.

The number, capability, and/or capacity of the elements 1008, 1010, 1012 may vary, depending on whether the device 1000 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 1007 may include computational logic 1022 configured to implement various firmware and/or software services associated with operations of the device 1000. For some embodiments, at least the one or more processors 1001 may be packaged together with computational logic 1022 configured to practice aspects of embodiments described herein to form a System in Package (SiP) or a System on Chip (SoC).

In various implementations, the device 1000 may include one or more components of a data center, a laptop, a netbook, a notebook, an ultrabook, a smartphone, a tablet, a personal digital assistant (PDA), an ultra mobile PC, a mobile phone, or a digital camera. In further implementations, the device 1000 may be any other electronic device that processes data.

Figure 11:
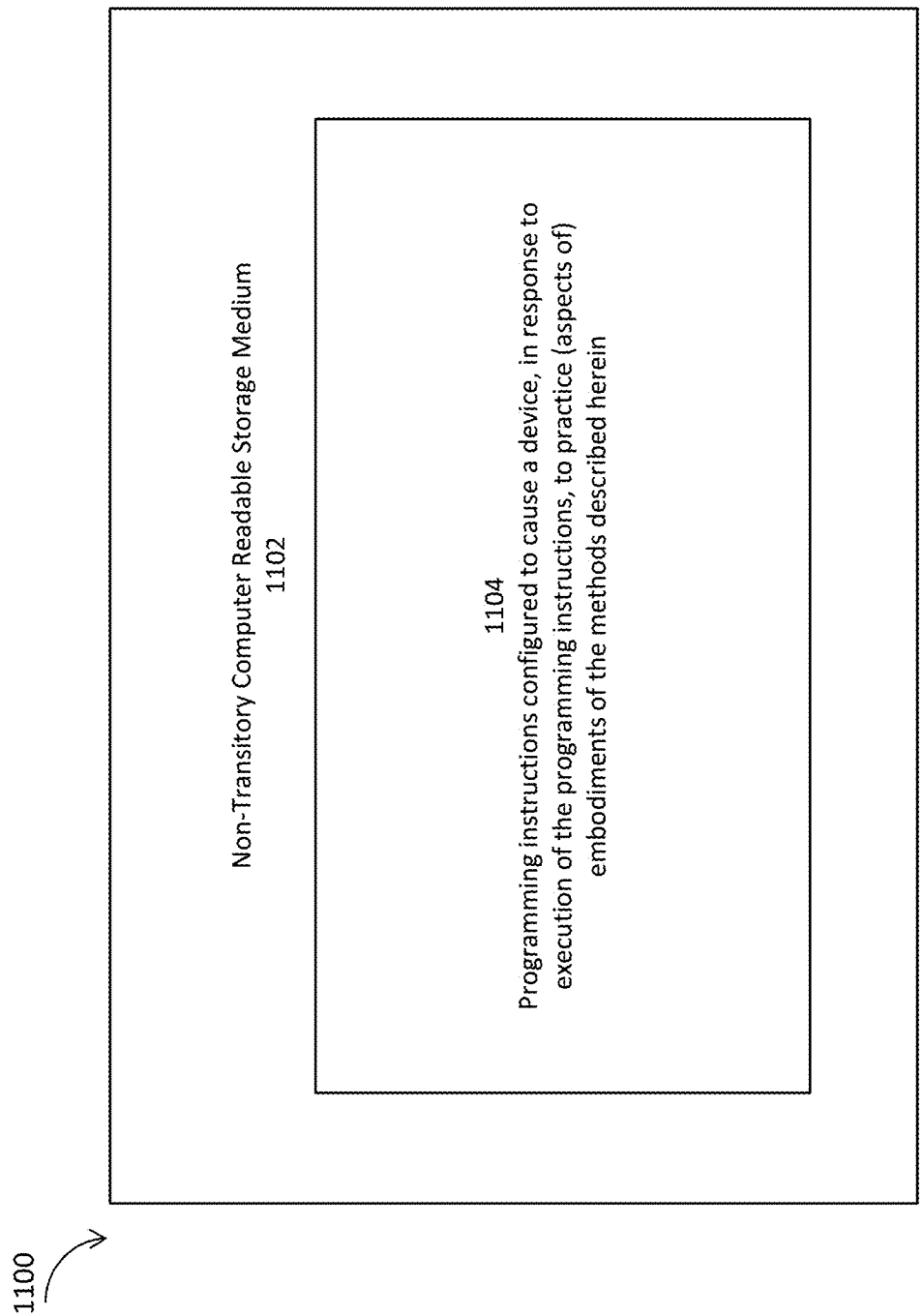
FIG. 11 illustrates a storage medium having instructions for practicing methods described with references to FIGS. 1-10, in accordance with various embodiments.

Furthermore, the present disclosure may take the form of a computer program product embodied in any tangible or non-transitory medium of expression having computer-usable program code embodied in the medium. FIG. 11 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1102 may include a number of programming instructions 1104. Programming instructions 1104 may be configured to enable a device, e.g., device 1000, in response to execution of the programming instructions, to perform, e.g., various operations associated with the processor tile 101 as shown in FIG. 1, the processor tile 201 as shown in FIG. 2, the processor 900 shown in FIG. 9, or other operations shown in this disclosure.

In alternate embodiments, programming instructions 1104 may be disposed on multiple computer-readable non-transitory storage media 1102 instead. In alternate embodiments, programming instructions 1104 may be disposed on computer-readable transitory storage media 1102, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include a processor tile on a die, comprising: a plurality of interface blocks; a programmable interconnect coupled to the plurality of interface blocks; a memory to store a plurality of configuration vectors representing virtual circuit (VC) segments including the processor tile; and a controller coupled to the plurality of interface blocks, the memory, and the programmable interconnect to control connections between the programmable interconnect and the plurality of interface blocks, based on the plurality of configuration vectors stored in the memory.

Example 2 may include the processor tile of example 1 and/or some other examples herein, wherein the controller is to: select a configuration vector in an idle state from the plurality of configuration vectors based on a priority number of the configuration vector; determine the selected configuration vector is in an issue ready state based on a comparison of available resources of the processor tile with resources for the configuration vector; load the configuration vector in the issue ready state onto the programmable interconnect to map the resources for the configuration vector to the resources of the processor tile to make the configuration vector into a loaded state; activate the configuration vector in the loaded state to become an active state by enabling a connection between the processor tile and a neighbor processor tile determined by the configuration vector; and release the resources of the processor tile for the configuration vector to change the configuration vector to a retired state.

Example 3 may include the processor tile of example 2 and/or some other examples herein, wherein to activate the configuration vector in the loaded state to become the active state, the controller is to: assert a code on an outgoing control line to indicate that the configuration vector is in the loaded state; detect a signal on an incoming control line to indicate the neighbor processor tile determined by the configuration vector is in a loaded state; enable the connection between the processor tile and the neighbor processor tile to activate the configuration vector in the loaded state to become the active state.

Example 4 may include the processor tile of any of examples 1-3 and/or some other examples herein, wherein the processor tile is included in a first VC determined by a first configuration vector stored in the memory during a first phase of a computation of a program, and included in a second VC determined by a second configuration vector stored in the memory during a second phase of the computation of the program.

Example 5 may include the processor tile of any of examples 1-3 and/or some other examples herein, wherein the processor tile is coupled to six neighbor processor tiles, placed in a direction of East (E), a direction of West (W), a direction of Northeast (NE), a direction of Northwest (NW), a direction of Southeast (SE), and a direction of Southwest (SW).

Example 6 may include the processor tile of any of examples 1-3 and/or some other examples herein, wherein the processor tile is a transit node of a VC, a message packet enters the processor tile through a first interface block of the plurality of interface blocks, passes through the programmable interconnect, and exits the processor tile through a second interface block of the plurality of interface blocks.

Example 7 may include the processor tile of any of examples 1-3 and/or some other examples herein, wherein the processor tile is a terminal node of a VC, and a message packet enters the processor tile through an interface block of the plurality of interface blocks, and is stored in a local storage of the interface block.

Example 8 may include the processor tile of any of examples 1-3 and/or some other examples herein, wherein a configuration vector of the plurality of configuration vectors is related to a VC segment including the processor tile coupled to a second processor tile, and the VC segment is an unbuffered channel through which a message packet passes between the processor tile and the second processor tile.

Example 9 may include the processor tile of any of examples 1-3 and/or some other examples herein, wherein a configuration vector of the plurality of configuration vectors includes an identification of a VC, an identification of a topology, a priority number of the configuration vector, a first port of the processor tile to be coupled to an entering neighbor processor tile, and a second port of the processor tile to be coupled to an exiting neighbor processor tile.

Example 10 may include the processor tile of any of examples 1-3 and/or some other examples herein, wherein a first configuration vector of the plurality of configuration vectors includes an identification of a first VC, and an identification of a first topology, a second configuration vector of the plurality of configuration vectors includes an identification of a second VC, and an identification of a second topology, and wherein the first topology corresponds to a first phase of a computation of a program, the second topology corresponds to a second phase of the computation of the program, the second phase of the computation is different from the first phase of the computation, and the second topology is different from the first topology.

Example 11 may include a computational device, comprising: a plurality of processor tiles on a die; a virtual circuit (VC) to include multiple processor tiles of the plurality of processor tiles, wherein a message packet traverses the multiple processor tiles of the VC in a single clock cycle; a first topology to include a first number of VCs, wherein the first topology corresponds to a first phase of a computation of a program, and a first processor tile of a first VC of the first topology includes a first configuration vector; a second topology to include a second number of VCs, wherein the second topology corresponds to a second phase of the computation of the program, a first processor tile of a second VC of the second topology includes a second configuration vector, the second phase of the computation is different from the first phase of the computation, and the second topology is different from the first topology; and wherein the first configuration vector included in the first processor tile of the first VC of the first topology is in an active state during the first phase of the computation of the program, the first configuration vector is in an inactive state during the second phase of the computation of the program, the second configuration vector included in the first processor tile of the second VC of the second topology is in an active state during the second phase of the computation of the program, and the second configuration vector is in an inactive state during the first phase of the computation of the program.

Example 12 may include the computational device of example 11 and/or some other examples herein, wherein the first processor tile of the first VC of the first topology is a transit node of the first VC, the first processor tile includes: a first interface block; a second interface block; and a programmable interconnect coupled to the first interface block and the second interface block, and wherein a message packet of the first phase of the computation enters the first processor tile through the first interface block, passes through the programmable interconnect, and exits the first processor tile through the second interface block.

Example 13 may include the computational device of example 11 and/or some other examples herein, wherein the first processor tile of the first VC of the first topology is a terminal node of the first VC, the first processor tile includes: an interface block, wherein the interface block includes a local storage, and wherein a message packet of the first phase of the computation enters the first processor tile through the interface block, and is stored in the local storage of the interface block.

Example 14 may include the computational device of any of examples 11-13 and/or some other examples herein, wherein the first configuration vector of the first processor tile of the first VC is related to a VC segment including the first processor tile of the first VC coupled to a second processor tile of the first VC, and the VC segment is an unbuffered channel through which a message packet of the first phase of the computation of the program passes between the first processor tile of the first VC and the second processor tile of the first VC.

Example 15 may include the computational device of any of examples 11-13 and/or some other examples herein, wherein the first configuration vector of the first processor tile of the first VC of the first topology includes a first information to identify the first VC, a second information to identify the first topology, a third information to identify a priority of the first configuration vector, a first port of the first processor tile to be coupled to an entering neighbor processor tile, and a second port of the first processor tile to be coupled to an exit neighbor processor tile.

Example 16 may include the computational device of any of examples 11-13 and/or some other examples herein, wherein a processor tile of the plurality of processor tiles includes: a memory to store a plurality of configuration vectors representing a plurality of VC segments including the processor tile; and a controller coupled to the memory to manage a life cycle of a configuration vector of the plurality of configuration vectors stored in the memory.

Example 17 may include the computational device of any of examples 11-13 and/or some other examples herein, wherein the life cycle of the configuration vector includes an idle state, an issue ready state, a loaded state, an active state, a retired state, or an inactive state.

Example 18 may include the computational device of example 11 and/or some other examples herein, wherein a processor tile of the plurality of processor tiles includes: a plurality of interface blocks; a programmable interconnect coupled to the plurality of interface blocks; a memory to store a plurality of configuration vectors representing VC segments including the processor tile; and a controller coupled to the plurality of interface blocks, the memory, and the programmable interconnect to control connections between the programmable interconnect and the plurality of interface blocks, based on the plurality of configuration vectors stored in the memory.

Example 19 may include the computational device of example 18 and/or some other examples herein, wherein the processor tile includes six interface blocks, the programmable interconnect is a multi-way crossbar, and the processor tile is coupled to six neighbor processor tiles, placed in a direction of East (E), a direction of West (W), a direction of Northeast (NE), a direction of Northwest (NW), a direction of Southeast (SE), and a direction of Southwest (SW).

Example 20 may include the computational device of example 18 and/or some other examples herein, wherein the controller is to: select a configuration vector in an idle state from the plurality of configuration vectors based on a priority number of the configuration vector; determine the selected configuration vector is in an issue ready state based on a comparison of available resources of the processor tile with resources for the configuration vector; load the configuration vector in the issue ready state onto the programmable interconnect to map the resources for the configuration vector to the resources of the processor tile to make the configuration vector into a loaded state; activate the configuration vector in the loaded state to become an active state by enabling a connection between the processor tile and a neighbor processor tile determined by the configuration vector; and release the resources of the processor tile for the configuration vector to change the configuration vector to a retired state.

Example 21 may include a computational device, comprising: a virtual circuit (VC) including multiple processor tiles on a die, wherein a message packet traverses the multiple processor tiles of the VC in a single clock cycle, and a processor tile of the multiple processor tiles includes: a plurality of interface blocks; a programmable interconnect coupled to the plurality of interface blocks; a memory to store a plurality of configuration vectors representing a VC segments including the processor tile; and a controller coupled to the plurality of interface blocks, the memory, and the programmable interconnect to control connections between the programmable interconnect and the plurality of interface blocks, based on the plurality of configuration vectors stored in the memory.

Example 22 may include the computational device of example 21 and/or some other examples herein, wherein the controller is to: select a configuration vector in an idle state from the plurality of configuration vectors based on a priority number of the configuration vector; determine the selected configuration vector is in an issue ready state based on a comparison of available resources of the processor tile with resources for the configuration vector; load the configuration vector in the issue ready state onto the programmable interconnect to map the resources for the configuration vector to the resources of the processor tile to make the configuration vector into a loaded state; activate the configuration vector in the loaded state to become an active state by enabling a connection between the processor tile and a neighbor processor tile determined by the configuration vector; and release the resources of the processor tile for the configuration vector to change the configuration vector to a retired state.

Example 23 may include the computational device of any of examples 21-22 and/or some other examples herein, wherein a configuration vector of the plurality of configuration vectors is related to a VC segment including the processor tile coupled to a second processor tile, and the VC segment is an unbuffered channel through which a message packet passes between the processor tile and the second processor tile.

Example 24 may include the computational device of any of examples 21-22 and/or some other examples herein, wherein a first configuration vector of the plurality of configuration vectors includes an identification of a first VC, and an identification of a first topology, a second configuration vector of the plurality of configuration vectors includes an identification of a second VC, and an identification of a second topology, and wherein the first topology corresponds to a first phase of a computation of a program, the second topology corresponds to a second phase of the computation of the program, the second phase of the computation is different from the first phase of the computation, and the second topology is different from the first topology.

Example 25 may include the computational device of any of examples 21-22 and/or some other examples herein, wherein the processor tile is coupled to six neighbor processor tiles, placed in a direction of East (E), a direction of West (W), a direction of Northeast (NE), a direction of Northwest (NW), a direction of Southeast (SE), and a direction of Southwest (SW).

Example 26 may include an apparatus comprising: a node that includes a 6-way (6×) hexagonal mesh stop.

Example 27 may include the apparatus of example 26 and/or some other example herein, wherein the 6× hexagonal mesh stop includes a 6× crossbar.

Example 28 may include the apparatus of example 27 and/or some other example herein, wherein the cross bar is to support a circuit-switched connection up to 50 millimeters (mm).

Example 29 may include the apparatus of example 26 and/or some other example herein, wherein up to 3 virtual circuits (VCs) are to transit through the node.

Example 30 may include the apparatus of example 29, wherein a VC of the 3 VCs is a direct, unbuffered signal pathway that extends through multiple mesh stops of the apparatus.

Example 31 may include a method comprising: mapping, by a state machine, issue-ready configuration vectors onto crossbar internal connections; snooping, by the state machine, control lines; reading, by the state machine, identifier (ID) data from neighboring cores; and monitoring, by the state machine, for termination and/or release signals.

Example 32 may include the method of example 31 and/or some other example herein, wherein external connections are disabled.

Example 33 may include the method of example 31 and/or some other example herein, wherein the method comprises enabling, by the state machine, external multiplexer (MUX) drives when the ID data from a neighboring core matches a local ID.

Example 34 may include the method of example 31 and/or some other example herein, wherein the method further comprises releasing, by the state machine, MUX resources upon receipt of a termination and/or release signal.

Example 35 may include an apparatus comprising means to perform one or more elements of a method described in or related to any of examples 1-34, or any other method or process described herein.

Example 36 may include one or more non-transitory computer-readable media comprising instructions to cause an electronic device, upon execution of the instructions by one or more processors of the electronic device, to perform one or more elements of a method described in or related to any of examples 1-34, or any other method or process described herein.

Example 37 may include an apparatus comprising logic, modules, and/or circuitry to perform one or more elements of a method described in or related to any of examples 1-34, or any other method or process described herein.

Example 38 may include a method, technique, or process as described in or related to any of examples 1-34, or portions or parts thereof.

Example 39 may include an apparatus comprising: one or more processors and one or more computer readable media comprising instructions that, when executed by the one or more processors, cause the one or more processors to perform the method, techniques, or process as described in or related to any of examples 1-34, or portions thereof.

Example 40 may include a method of communicating in a wireless network as shown and described herein.

Example 41 may include a system for providing wireless communication as shown and described herein.

Example 42 may include a device for providing wireless communication as shown and described herein.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. A processor tile on a die, comprising:
   a plurality of interface blocks;
   a programmable interconnect coupled to the plurality of interface blocks;
   a memory to store a plurality of configuration vectors representing virtual circuit (VC) segments including the processor tile, wherein a configuration vector of the plurality of configuration vectors includes an identification of a VC, a priority number of the configuration vector, an identification of a topology, a first port of the processor tile to be coupled to an entering neighbor processor tile, and a second port of the processor tile to be coupled to an exiting neighbor processor tile; and
   a controller coupled to the plurality of interface blocks, the memory, and the programmable interconnect to control connections between the programmable interconnect and the plurality of interface blocks, based on the plurality of configuration vectors stored in the memory.

2. The processor tile of claim 1, wherein the controller is to:
   select a configuration vector in an idle state from the plurality of configuration vectors based on a priority number of the configuration vector;
   determine the selected configuration vector is in an issue ready state based on a comparison of available resources of the processor tile with resources for the configuration vector;
   load the configuration vector in the issue ready state onto the programmable interconnect to map the resources for the configuration vector to the resources of the processor tile to make the configuration vector into a loaded state;
   activate the configuration vector in the loaded state to become an active state by enabling a connection between the processor tile and a neighbor processor tile determined by the configuration vector; and
   release the resources of the processor tile for the configuration vector to change the configuration vector to a retired state.

3. The processor tile of claim 2, wherein to activate the configuration vector in the loaded state to become the active state, the controller is to:
   assert a code on an outgoing control line to indicate that the configuration vector is in the loaded state;
   detect a signal on an incoming control line to indicate the neighbor processor tile determined by the configuration vector is in a loaded state;
   enable the connection between the processor tile and the neighbor processor tile to activate the configuration vector in the loaded state to become the active state.

4. The processor tile of claim 1, wherein the processor tile is included in a first VC determined by a first configuration vector stored in the memory during a first phase of a computation of a program, and included in a second VC determined by a second configuration vector stored in the memory during a second phase of the computation of the program.

5. The processor tile of claim 1, wherein the processor tile is coupled to six neighbor processor tiles, placed in a direction of East (E), a direction of West (W), a direction of Northeast (NE), a direction of Northwest (NW), a direction of Southeast (SE), and a direction of Southwest (SW).

6. The processor tile of claim 1, wherein the processor tile is a transit node of a VC, a message packet enters the processor tile through a first interface block of the plurality of interface blocks, passes through the programmable interconnect, and exits the processor tile through a second interface block of the plurality of interface blocks.

7. The processor tile of claim 1, wherein the processor tile is a terminal node of a VC, and a message packet enters the processor tile through an interface block of the plurality of interface blocks, and is stored in a local storage of the interface block.

8. The processor tile of claim 1, wherein a configuration vector of the plurality of configuration vectors is related to a VC segment including the processor tile coupled to a second processor tile, and the VC segment is an unbuffered channel through which a message packet passes between the processor tile and the second processor tile.

9. The processor tile of claim 1, wherein a first configuration vector of the plurality of configuration vectors includes an identification of a first VC, and an identification of a first topology, a second configuration vector of the plurality of configuration vectors includes an identification of a second VC, and an identification of a second topology, and wherein the first topology corresponds to a first phase of a computation of a program, the second topology corresponds to a second phase of the computation of the program, the second phase of the computation is different from the first phase of the computation, and the second topology is different from the first topology.

10. A computational device, comprising:
a plurality of processor tiles on a die;
a virtual circuit (VC) to include multiple processor tiles of the plurality of processor tiles, wherein a message packet traverses the multiple processor tiles of the VC in a single clock cycle;
a first topology to include a first number of VCs, wherein the first topology corresponds to a first phase of a computation of a program, and a first processor tile of a first VC of the first topology includes a first configuration vector;
a second topology to include a second number of VCs, wherein the second topology corresponds to a second phase of the computation of the program, a first processor tile of a second VC of the second topology includes a second configuration vector, the second phase of the computation is different from the first phase of the computation, and the second topology is different from the first topology; and
wherein the first configuration vector included in the first processor tile of the first VC of the first topology is in an active state during the first phase of the computation of the program, the first configuration vector is in an inactive state during the second phase of the computation of the program, the second configuration vector included in the first processor tile of the second VC of the second topology is in an active state during the second phase of the computation of the program, and the second configuration vector is in an inactive state during the first phase of the computation of the program, and
wherein the first configuration vector of the first processor tile of the first VC of the first topology includes a first information to identify the first VC, a second information to identify the first topology, a third information to identify a priority of the first configuration vector, a first port of the first processor tile to be coupled to an entering neighbor processor tile, and a second port of the first processor tile to be coupled to an exit neighbor processor tile.

11. The computational device of claim 10, wherein the first processor tile of the first VC of the first topology is a transit node of the first VC, the first processor tile includes:
a first interface block;
a second interface block; and
a programmable interconnect coupled to the first interface block and the second interface block, and wherein a message packet of the first phase of the computation enters the first processor tile through the first interface block, passes through the programmable interconnect, and exits the first processor tile through the second interface block.

12. The computational device of claim 10, wherein the first processor tile of the first VC of the first topology is a terminal node of the first VC, the first processor tile includes:
an interface block, wherein the interface block includes a local storage, and wherein a message packet of the first phase of the computation enters the first processor tile through the interface block, and is stored in the local storage of the interface block.

13. The computational device of claim 10, wherein the first configuration vector of the first processor tile of the first VC is related to a VC segment including the first processor tile of the first VC coupled to a second processor tile of the first VC, and the VC segment is an unbuffered channel through which a message packet of the first phase of the computation of the program passes between the first processor tile of the first VC and the second processor tile of the first VC.

14. The computational device of claim 10, wherein a processor tile of the plurality of processor tiles includes:
a memory to store a plurality of configuration vectors representing a plurality of VC segments including the processor tile; and
a controller coupled to the memory to manage a life cycle of a configuration vector of the plurality of configuration vectors stored in the memory.

15. The computational device of claim 10, wherein the life cycle of the configuration vector includes an idle state, an issue ready state, a loaded state, an active state, a retired state, or an inactive state.

16. The computational device of claim 10, wherein a processor tile of the plurality of processor tiles includes:
a plurality of interface blocks;
a programmable interconnect coupled to the plurality of interface blocks;
a memory to store a plurality of configuration vectors representing VC segments including the processor tile; and
a controller coupled to the plurality of interface blocks, the memory, and the programmable interconnect to control connections between the programmable interconnect and the plurality of interface blocks, based on the plurality of configuration vectors stored in the memory.

17. The computational device of claim 16, wherein the processor tile includes six interface blocks, the programmable interconnect is a multi-way crossbar, and the processor tile is coupled to six neighbor processor tiles, placed in a direction of East (E), a direction of West (W), a direction of Northeast (NE), a direction of Northwest (NW), a direction of Southeast (SE), and a direction of Southwest (SW).

18. The computational device of claim 16, wherein the controller is to:
select a configuration vector in an idle state from the plurality of configuration vectors based on a priority number of the configuration vector;
determine the selected configuration vector is in an issue ready state based on a comparison of available resources of the processor tile with resources for the configuration vector;
load the configuration vector in the issue ready state onto the programmable interconnect to map the resources for the configuration vector to the resources of the processor tile to make the configuration vector into a loaded state;

activate the configuration vector in the loaded state to become an active state by enabling a connection between the processor tile and a neighbor processor tile determined by the configuration vector; and release the resources of the processor tile for the configuration vector to change the configuration vector to a retired state.

19. A computational device, comprising:

a virtual circuit (VC) including multiple processor tiles on a die, wherein a message packet traverses the multiple processor tiles of the VC in a single clock cycle, and a processor tile of the multiple processor tiles includes:

a plurality of interface blocks;

a programmable interconnect coupled to the plurality of interface blocks;

a memory to store a plurality of configuration vectors representing VC segments including the processor tile; and a controller coupled to the plurality of interface blocks, the memory, and the programmable interconnect to control connections between the programmable interconnect and the plurality of interface blocks, based on the plurality of configuration vectors stored in the memory, wherein a first configuration vector of the plurality of configuration vectors includes an identification of a first VC, and an identification of a first topology, a second configuration vector of the plurality of configuration vectors includes an identification of a second VC, and an identification of a second topology, and wherein the first topology corresponds to a first phase of a computation of a program, the second topology corresponds to a second phase of the computation of the program, the second phase of the computation is different from the first phase of the computation, and the second topology is different from the first topology.

20. The computational device of claim 19, wherein the controller is to:

select a configuration vector in an idle state from the plurality of configuration vectors based on a priority number of the configuration vector;

determine the selected configuration vector is in an issue ready state based on a comparison of available resources of the processor tile with resources for the configuration vector;

load the configuration vector in the issue ready state onto the programmable interconnect to map the resources for the configuration vector to the resources of the processor tile to make the configuration vector into a loaded state;

activate the configuration vector in the loaded state to become an active state by enabling a connection between the processor tile and a neighbor processor tile determined by the configuration vector; and release the resources of the processor tile for the configuration vector to change the configuration vector to a retired state.

21. The computational device of claim 19, wherein a configuration vector of the plurality of configuration vectors is related to a VC segment including the processor tile coupled to a second processor tile, and the VC segment is an unbuffered channel through which a message packet passes between the processor tile and the second processor tile.

22. The computational device of claim 19, wherein the processor tile is coupled to six neighbor processor tiles, placed in a direction of East (E), a direction of West (W), a direction of Northeast (NE), a direction of Northwest (NW), a direction of Southeast (SE), and a direction of Southwest (SW).

* * * * *